April 19, 1966 M. P. SIEGER 3,246,552
SHEARING APPARATUS
Filed April 1, 1964 5 Sheets-Sheet 4
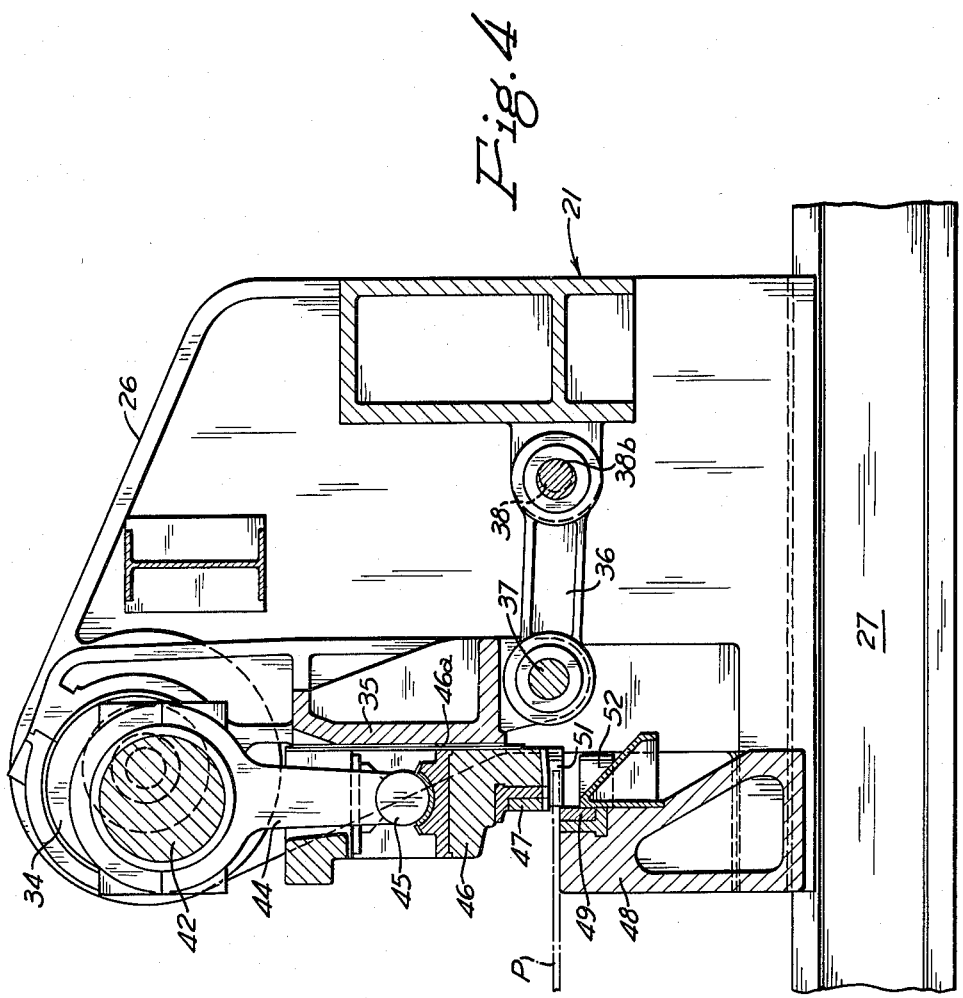
INVENTOR.
MAURICE P. SIEGER
BY
ATTORNEY.

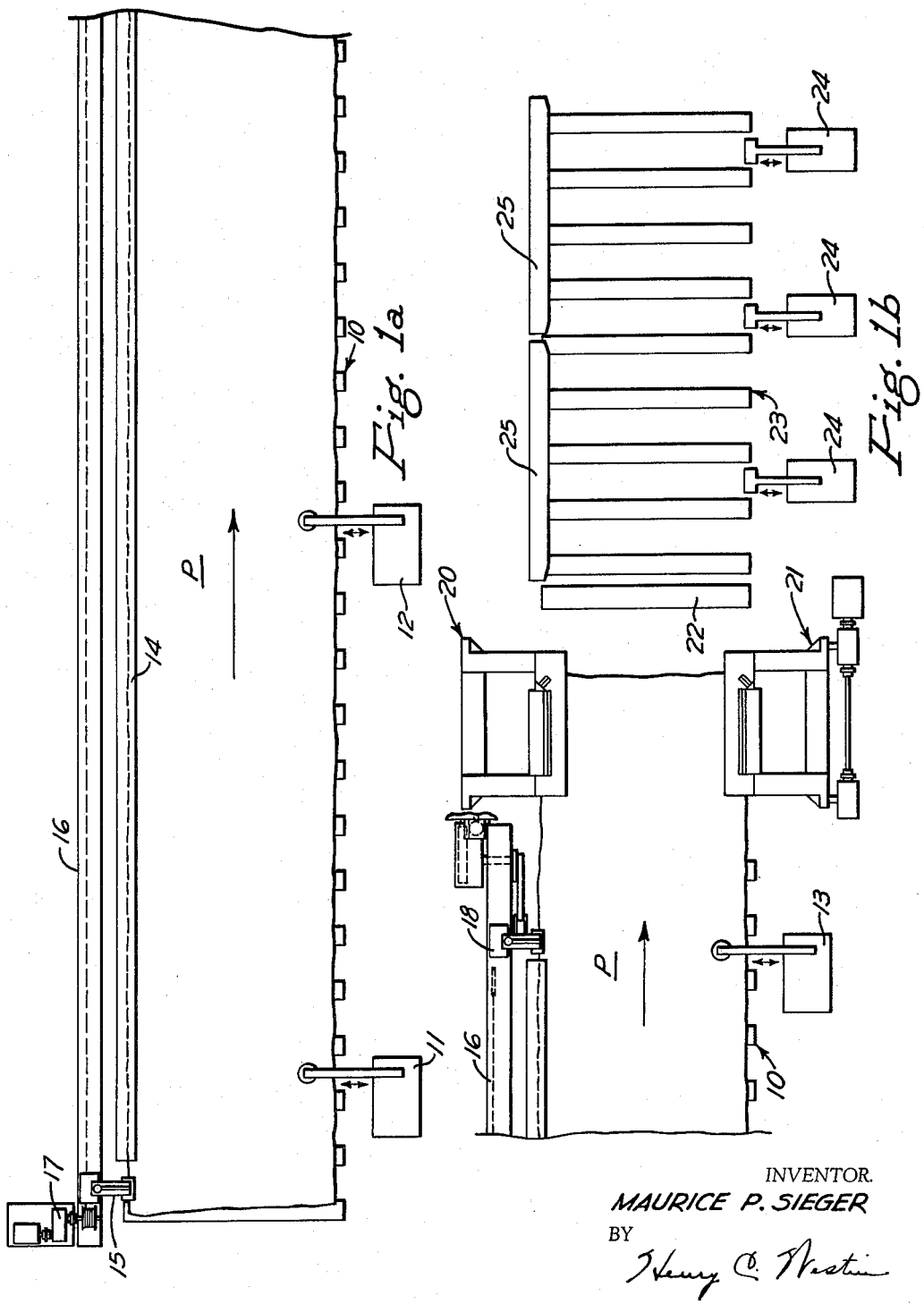

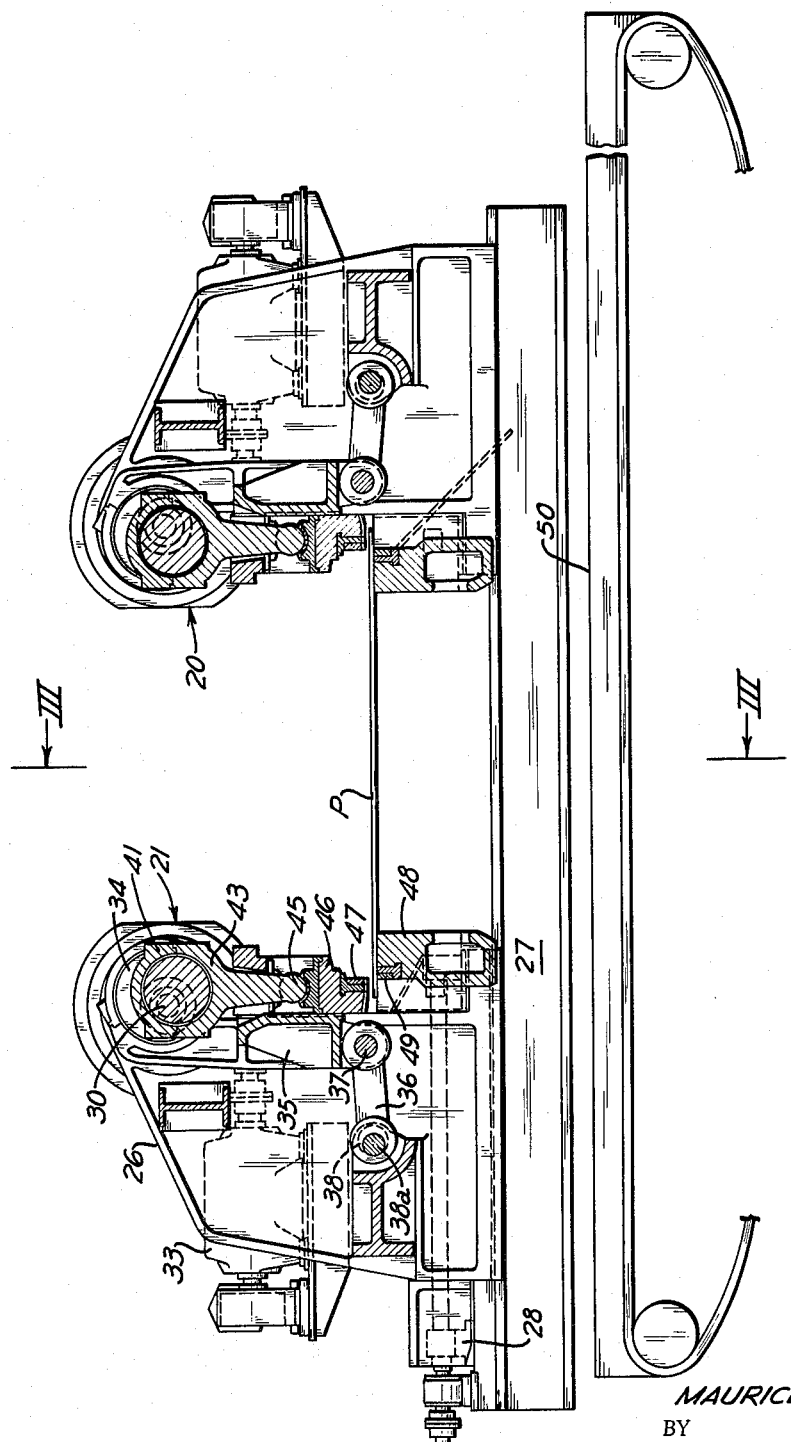

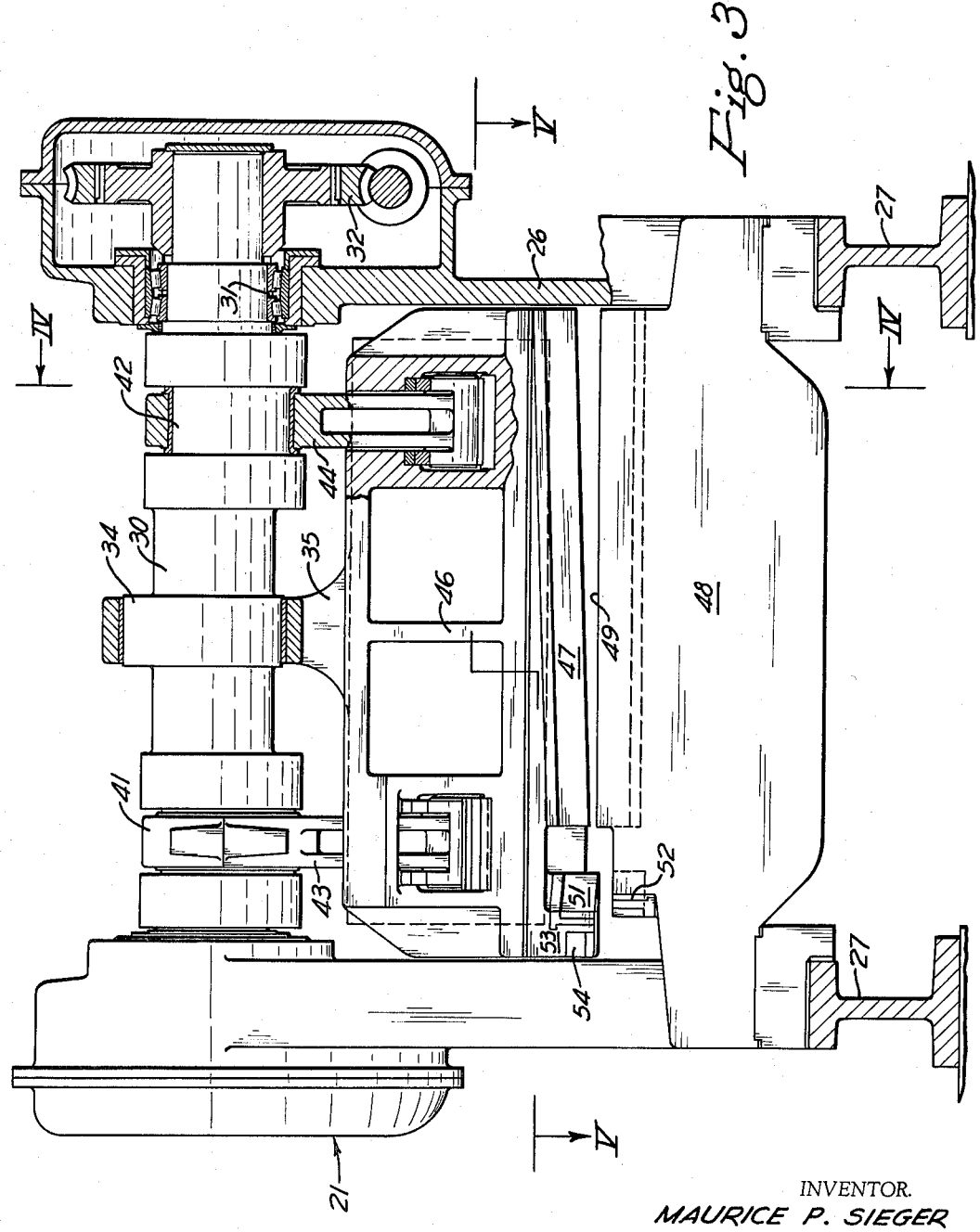

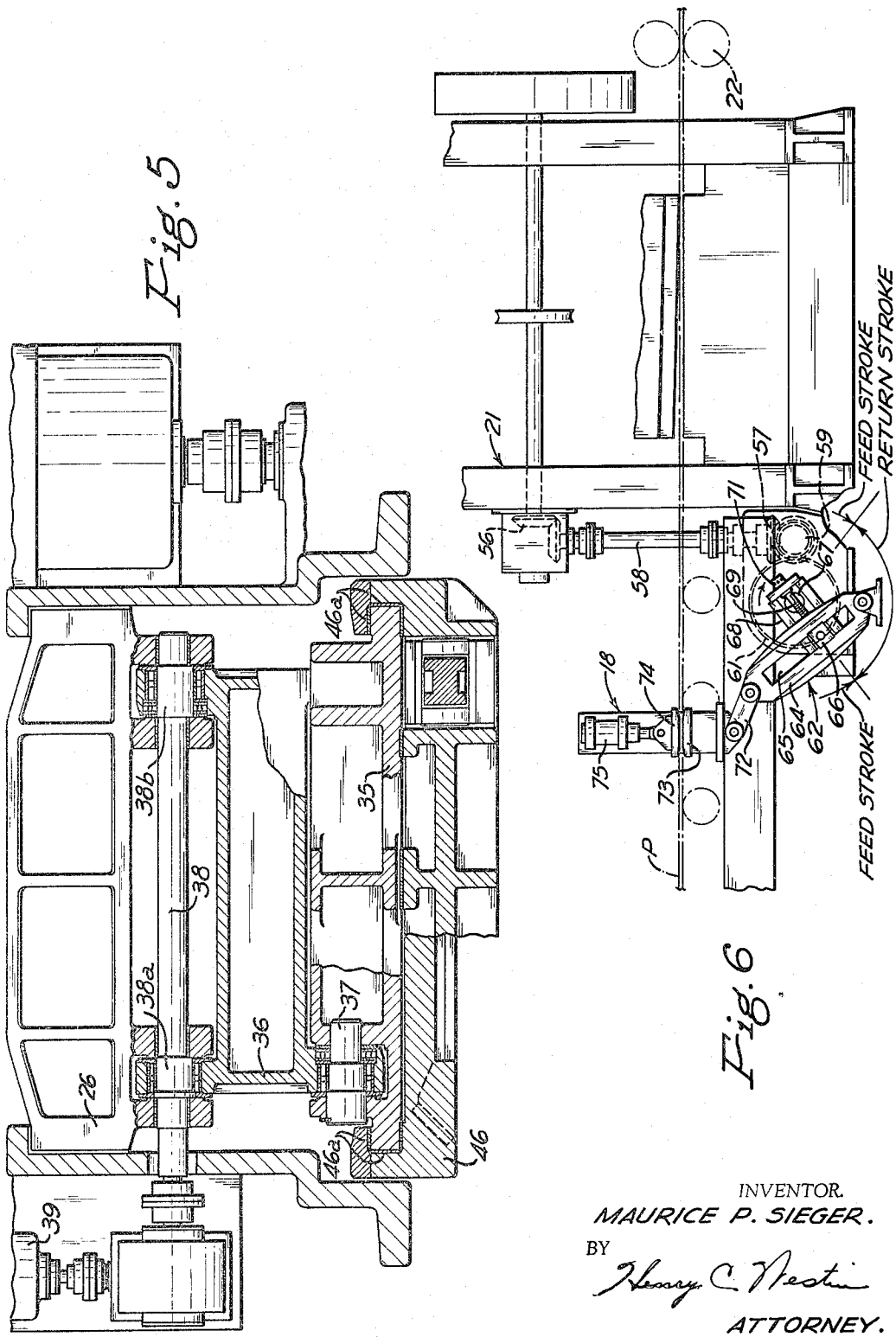

United States Patent Office 3,246,552
Patented Apr. 19, 1966

3,246,552
SHEARING APPARATUS
Maurice Paul Sieger, Pittsburgh, Pa., assignor to United Engineering and Foundry Company, Pittsburgh, Pa., a corporation of Pennsylvania
Filed Apr. 1, 1964, Ser. No. 356,474
Claims priority, application Great Britain, Apr. 9, 1963, 14,071/63
9 Claims. (Cl. 83—215)

This invention relates to the shearing of material, as, for example, the shearing of the opposed marginal edges of elongated metallic plates, such as produced by a rolling mill.

While the present invention may have utility in the severing of various types of strip-like material and, for that matter, other forms of material, for the purposes of description, since it has been found to be immediately applicable to the side trimming of the longitudinal, marginal scrap edges of metallic plates, the problem incident to this operation and the utilization of the present invention relative thereto will be described.

In the rolling of carbon-steel plates in a modern plate rolling mill, it is customary to provide after the mill, equipment for treating and finally shearing the plates into marketable form. This equipment usually is arranged as an integral part of the rolling mill. While in the trade plates are classified in accordance with their thicknesses and weights, for present purposes it is believed only necessary to note that plates produced by the mills may range in thickness from slightly below ⅛ inch to slightly above 1½ inches having a maximum width and length, for example, of 220 inches by 720 inches, respectively. While the plate shearing equipment, as may be expected, varies considerably in construction and arrangement, it is important to note that the building area of the shearing facilities generally greatly exceeds that of the rolling mill facilities.

Objectives in producing marketable plates

The objectives incident to producing marketable plates of the highest quality as far as relevancy to the shearing thereof may be summarized as follows:

To side trim the longitudinal marginal scrap edges of the plates in a manner that parallelism is assured along the opposed longitudinal sides thereof, and wherein the sheared edges are substantially perpendicular to the upper and lower surfaces of the plates irrespective of the varying thicknesses of the plates;

To side trim the plates wherein an accurate simple reliable construction is provided to vary the horizontal distance between the knives in accordance with the varying thicknesses of the plates;

To side trim the plates in a manner that the shearing will not cause any indentations or markings along the sheared edges of the plates;

To side trim the plates in a manner that the plates are sheared simultaneously by directly opposed shears, as distinguished from the opposite edges being sheared alternatively;

To side trim in a manner wherein the plates are advanced almost instantaneously after the side trimming of a portion thereof has been completed;

To side trim the plates wherein the movable knives are not caused to rub against the sheared edges of the plates;

To side trim the plate in a manner to assure that the plates will be maintained in the proper transverse relationship with respect to the shears;

To side trim the plates wherein the shearing equipment requires the very minimum of plant space, but yields the highest shearing capacity, particularly in the arrangement required to handle a wide range of plates; and, finally, To side trim the plates wherein there is provided means for automatically feeding the plates to assure that the proper lengths of each portion of the plates to be sheared will be advanced as quickly as possible.

Previous plate shearing equipment and their disadvantages and limitations

The previous equipment and arrangements for side trimming plates may be conveniently identified as a "guillotine" shear arrangement or a rotary shear arrangement. The "guillotine" shear arrangement included a shear having a stationary lower knife and a reciprocal upper knife which cooperated with the lower knife to effect a shearing action. U. S. Patent No. 1,617,486 which issued to C. L. Huston on February 15, 1927 illustrated such a shear. The longitudinal marginal edges of the plates in this shear arrangement were advanced intermittently into the shear bite either by hand or otherwise. In certain forms, as indicated above, these shears were arranged in separate shearing lines or staggered one from another in the same shearing line in which in one rolling mill plant the distance separating the staggered shears amounted to approximately 78 feet. In other plants only one shear was employed and the plates were rotated 180 degrees on a caster bed arranged in front of the shear. In the third form the shears were arranged directly opposite each other to simultaneously shear the opposite edges of the plate. This is the arrangement illustrated in the aforesaid-referred to Huston patent.

The shearing of plate by the use of a rotary shear which includes two shears spaced directly apart from each other had the advantage over the "guillotine" type shears in that they produced a truer parallel sheared edge. This was due to the fact that the cooperative pair of opposed rotatable knives served as guides for the moving plates. However, in addition to the limitation that it has not been found practical to employ rotary shears for plate thicknesses exceeding ¾ inch, great difficulty, as will be subsequently noted, has been experienced in handling and shearing of the scrap edge portions. As will be subsequently noted, it was necessary to employ separate scrap shears for each marginal side trimmed edge and the problem of guiding these portions to the shear was extremely acute. The problems incident to shearing such trimmed portions is discussed in U.S. Patent No. 2,084,967 which issued to C. R. Babb on June 22, 1937.

The previous plate side trimming shear designs incorporated basically two different procedures for shearing into short lengths the scrap marginal edges. One design called for use of a separate scrap shear located on the delivery side of the side trimming shears. This arrangement had the disadvantage of not only being very expensive since it involved two separate scrap shears, but the shears necessitated continued maintenance to keep them in operating order. Even more detrimental was the fact that it was extremely difficult to guide the sheared scrap edges to the scrap shears, as pointed up in the aforesaid-referred to Babb patent.

The second procedure for shearing the scrap edge portions into short lengths consisted of mounting an upper scrap knife on the reciprocal head of the side trimming "guillotine" shear and at right angles to the side trimming knives and to provide a cooperating lower scrap knife on the lower shear head. The upper scrap knife was mounted on the high side of the movable shear knife, it being understood that in view of the fact that the plates being sheared were in a cold condition, the knife was usually arranged at an oblique angle to the upper surface of the plate which had the effect of reducing the force necessary to effect a cut. The scrap knife being mounted on the upper end of the rake necessitated that the shear be designed with a sufficient stroke to enable the scrap knife to pass through the scrap portion. Such a scrap knife arrangement is illustrated in the aforesaid-referred to Huston patent.

One of the disadvantages in such a scrap knife arrangement resided in the fact that the shearing action was a punching action. It must be appreciated that in this arrangement the scrap portions are removed immediately adjacent to the unsheared portion of the plate which offers a substantial resistance to shearing and, as a result, during the shearing action, if the blades are not maintained in an optimum sharp condition and properly aligned, with respect to the side trimming knives the sheared edge was marked or indented which affects the marketability of the plates.

Prior shears of the type under discussion also provided a means for allowing the movable knife to fall away from the edge of the plate after the shearing action had taken place, thereby to prevent the knife from contacting the sheared edge on its return stroke and allowing the plate to be quickly advanced. This feature is also illustrated in the aforesaid-referred to Huston patent. However, to accomplish this result, it was found necessary to design the shear so that after the shearing action had been completed the movable knife head would continue to be lowered, but since it would be moving in an arcuate path, the knife would be caused to move away from the edge of the plate. While certain prior shear designs do not require such an action, in all shearing arrangements the upper end of the movable knife was passed through the plate.

It is significant to note that recent side trimming shear designs have been patterned after the shear illustrated in the aforesaid-referred to Huston patent, in that means were provided for retracting the movable knife away from the edge of the plate immediately following the shearing action and that the scrap knife was mounted on the high side of the rake.

Features and objects of present invention

It is an object of the present invention to provide a shearing arrangement which will overcome each and every one of the aforesaid enumerated disadvantages and limitations and satisfy completely each of the objectives previously enumerated.

In one form the present invention provides a shear including a housing, a shaft rotatably carried by said housing, a frame received in said housing and carried by said shaft in a manner to cause reciprocatory movement of said frame in a direction toward and away from said material, a knife head received by said frame in a manner to allow relative movement therebetween, a first knife carried by said knife head, a second knife arranged so that the material can be placed between the two knives, said knife head carried by said shaft in a manner to cause the first knife to move toward said other knife to effect a severing of the material and thereafter to move away from said other knife, and means associated with said frame for causing said knife head and hence said first knife to assume a desired path of movement during the severing of the material and immediately thereafter.

As will be more fully understood from the subsequent remarks, this arrangement permits the mounting of the scrap knife on the lower end of the movable raked knife so that during a subsequent side trimming cycle a sheared scrap portion formed by a preceding shearing cycle will be sheared. In this manner there is alleviated any tendency to mark or indent the sheared edge of the plate.

It is also a feature of the present invention to provide a plate feeding means which will be correlated to the adjustable speed of the shear and be adjustable, for example, pursuant to the thickness of the plates, whereby when thicker plates are being sheared in which a longer side trimming cut can be effected, the proper length of the plate will be automatically fed to the shear.

It is another feature of the present invention to construct the movable shear head in such a way that prior to shearing and as an adjunct to shearing, the plate will be automatically centered to assist in obtaining true parallel sheared edges.

The present invention, therefore, contemplates as far as the construction of the shear proper is concerned, providing a pair of cooperative knives, one of which is mounted on a reciprocating head, said head connected to a main drive shaft and the first eccentric carried in said drive shaft operatively associated with said head moving a distance sufficient only to effect a shearing of the thickest plate, a frame for receiving the movable shear head, a second eccentric carried in said main drive shaft, said eccentric connected to said frame, means for maintaining the movable knife substantially perpendicular to the plate during the shearing action and for effecting a displacement of said frame so as to cause said movable knife to be displaced in a horizontal direction away from the edge of the plate immediately after the shear action is completed and while the movable knife is in its return stroke, wherein said movable knife is obliquely arranged relative to the other knife, and in which construction a shearing action is effected by passing a portion of the knife, less than its total length, through the plate, a scrap knife mounted at the lower end of said obliquely arranged movable knife, a pair of cooperative scrap knives associated with said other knives wherein on the rotation of said main drive shaft said frame and shear will be lowered and said scrap knives will sever the scrap formed by a previous side trimming operation at the same time the shear is performing a succeeding side trimming operation.

These features and advantages, along with others, will become apparent when the following description is read in the light of the accompanying drawings of which:

FIGURES 1a and 1b represent a plan view of a shearing arrangement incorporating the features of the present invention, the parts illustrated being diagrammatically shown for the purpose of illustration;

FIGURE 2 is a sectional view of the two opposed shears incorporating the features of the present invention, the movable upper knives being shown in their raised positions with a plate shown between the cooperative knives of each shear, this view being taken at the right-hand side of the shears shown in FIGURE 1b;

FIGURE 3 is a view taken on lines III—III of FIGURE 2, showing in particular, the scrap knife and plate centering member arranged at the lower end of the upper knife;

FIGURE 4 is a sectional view taken on lines IV—IV of FIGURE 3;

FIGURE 5 is a section taken on lines V—V of FIGURE 3; and

FIGURE 6 is a diagrammatic view of the plate feeding mechanism herein disclosed.

General description and operation of major components of shearing arrangement With reference to the drawings and in referring, first, to FIGURES 1a and 1b, it may be well, first, to identify some of the major components of equipment before pursuing a discussion thereof in detail. In this way the relationship they have to each other can be first appreciated. Accordingly, in FIGURE 1a there is diagrammatically shown a shear entry table 10 consisting of a number of spaced-apart parallel rollers which are driven by a means not shown and by which means a plate P is advanced to a pair of side trimming shears, the longitudinal extending arrow indicating the direction of movement of the plate. In conjunction with the shear entry table 10, there is provided at the one end three identical plate traversing assemblies 11, 12 and 13, the latter being shown in FIGURE 1b, which include plate engaging clamps that grip the adjacent marginal edge of the plate and shift it toward the other side of the table.

At the other side of the table 10 there is arranged an overhung elongated straight edge member 14, having a front edge which is in alignment with one of the knives of the adjacent shear. In this way the plate traversing assemblies 11, 12 and 13 move the entire one edge of the plate under the straight edge member 14, thus assuring that a marginal portion of the plate will be removed along its entire length thereof. At the far end of the table that is remote from the shears, there is provided a plate holding member 15 which includes a plate engageable clamp that engages the end portion of a plate. The holding member 15 is traversed over an elongated track 16, for which purpose a cable drive 17 is provided and in which construction the track extends along the table 10 for approximately its entire length. At the end of the table adjacent the shear which is shown in FIGURE 1b, there is provided a plate feeding assembly 18 which traverses toward the shears, this assembly being also carried by the track 16.

We now come to the shears shown in FIGURE 1b, which essentially comprise identical shearing assemblies 20 and 21, the shear 20 being a stationary shear, whereas the shear 21 is adapted to be traversed toward and away from the shear 20. At the delivery side of the shear and closely adjacent thereto, there is located a pinch roll unit 22, one roll of which is only shown, after which immediately follows a shear delivery table 23 which includes a number of parallel spaced-apart driven rollers, the drives for which are not shown. Cooperating with the delivery table 23, there are three plate pushing assemblies 24, which have plate edge engaging members that engage the adjacent edge of the plate and urge it in a direction of the other side of the table 23. At the other side of the table there is provided elongated adjusable guards 25 which have plate engaging surfaces that line up with one of the knives of the adjacent shear 20.

Description and operation of the shears

In now turning to the details of the construction of the shears 20 and 21, reference is made to FIGURES 2 and 3. In view of the fact that the shears are identical, aside from the shear 21 being transversely adjustable whereas the shear 20 is not, reference will only be made to the adjustable shear 21. It comprises a shear housing 26 which is slidably mounted on a base 27 over which it is advanced by a threaded shaft-nut arrangement 28, the shaft being rotated by a motor, not shown. In this manner the shear 21 is positioned to accommodate the various widths of the plates delivered to it for side trimming.

Rotatably received in the housing 26 is a main crank shaft 30, which is carried at its opposite ends by large anti-friction bearings 31, one of which is shown at the right-hand side of FIGURE 3. At the opposite ends of the shaft 30, as shown in FIGURE 3, there are provided wormwheel sets 32, the worms being driven by separate variable speed motors 33, one of which is only shown in the drawing, that being in FIGURE 2. Around the crank shaft 30 and rotatable relative thereto, there is provided a centrally arranged eccentric 34, to which there is connected a frame 35. As shown in FIGURES 2, 4 and 5, at the bottom of the frame 35, one end of a link 36 is connected thereto by rotatable pins 37, the other end of the link being rotatably secured to the shear housing 26 by an eccentric shaft 38 having spaced-apart eccentrics 38a and 38b. As shown in FIGURE 5, the shaft 38 is driven by a motor 39 by which construction the frame 35 may be adjusted in a horizontal direction. The significance of this feature will be discussed in greater detail hereinafter.

Also rotatably connected to the main crank shaft 30 on either side of the eccentric 34 are two identical eccentrics 41 and 42. To these eccentrics are secured pitmans 43 and 44. At the lower ends of the pitmans, ball joints 45 are provided for pivotally securing to the pitmans a knife head 46 which carries the elongated raked knife 47. The knife head 46 is received in vertical guides 46a formed in the frame 35 which can be best seen in referred to FIGURES 4 and 5.

Arranged opposite to the knife head 46 is a lower knife head 48 which carries an elongated horizontally arranged knife 49 that cooperates with the upper knife 47 to effect a side trimming of the plate P. As mentioned previously, the knife 47 is raked or obliquely arranged relative to the knife 49 and, in the preferred arrangement the stroke of the pitmans 43 and 44 will be such that the extreme upper end of the rake knife 47 will be prevented from engaging the plate during the shearing stroke notwithstanding the thickness of the plate being sheared.

To the lower end of the upper shear head 46, there is secured at approximately right angles thereto a scrap knife 51, which as shown in FIGURE 3, is constructed and arranged to precede the upper knife 47. The lower knife head 48 is provided with a stationary scrap knife 52 arranged at a lower elevation relative to the lower knife 49. The sheared scrap fall onto a scrap conveyor 50, shown only in FIGURE 2, which carries it away from the shears.

It is important to note another feature of the herein-disclosed shear which has reference to the extension 53 formed on the top knife head 46 which is best shown at the left of the shear illustrated in FIGURE 3. To this extension there is provided a hardened steel liner 54, the arrangement being such that the liner will precede the upper knife 47 as the latter descends to make a cut and engage the sheared straight edge of the plate to urge it in a direction toward the center of the table should the plate have inadvertently shifted out of line and toward the shear during the previous shearing operation. Of course, a similar action occurs on the operation of the opposite shear 20, the combined effect being to center the plate between the shears if misalignment occurs.

Controlled movement and adjustment of shear knife

In returning again to the eccentric arrangement herein disclosed, it is to be appreciated that the eccentrics 34, 41 and 42 are so arranged relative to one another that during the shearing stroke, the frame 35 which carries the upper shear head 46 will present the shear head and its knife 47 so that the knife will assume a substantially perpendicular relationship relative to the plate during the period of shearing. Moreover, the cranks 41 and 42 through which the shearing torque will be supplied will bring the pitmans 43 and 44 to their lowest point, at which point as previously mentioned, the upper end of the raked upper knife 47 will not contact the plate. The eccentrics are also arranged so that immediately upon completion of the shearing, the upper knife will begin its return stroke whereas the frame 35 will continue to lower, but due to the influence of the link 36 will rapidly fall away from the sheared edge of the plate P, carrying the shear head 46 with it, whereby the knife 47 will be displaced away from the sheared edge of the plate. By this arrangement the plate is made ready to be advanced almost immediately after the shearing whereby the production of the shear can be maintained at its optimum rate.

It is also equally important to call attention to the location of the axes of the shaft 38 and the pins 37 relative to to the axis of the crank shaft 30 and the position of the shearing surface of the upper knife relative to the plate immediately before the contact is made. FIGURE 4 shows the maximum thickness plate (1½ inches) wherein it will be observed that the axes of the pins 37 are slightly higher (¼ inch) than the upper surface of the plate P, and that the axes of the shaft 38 and eccentrics 38a and 38b when in their high positions are arranged slightly below (1½–1¾ inches respectively) the axes of the pins 37 when in their high positions, the axes of the shaft 38 being coplanar with the upper surface of the lower knife 49. One of the features of this construction is to present the knife 47 when it contacts the plate P substantially perpendicular to the upper surface of the plate and to substantially maintain the relationship throughout the shearing stroke, after which the knife will quickly fall away from the sheared edge.

As previously mentioned, it is highly desirable to be able to vary the horizontal distance, i.e., knife clearance between the shearing surfaces of the upper knife 47 and the lower knife 49 in accordance with the thickness of the plate being side trimmed. In the illustrated shear this distance amounts to .130 inch. This, however, must be accomplished in a manner that will not disturb the substantially perpendicular shearing action. It is one of the features of the present invention to provide for adjusting the frame 35 in such a manner that both the required range of knife clearance can be obtained along with assuring that the substantial perpendicular shearing action is maintained.

By virtue of the previously noted relationships and in again referring to FIGURE 4, it will be noted that upon the rotation of the eccentrics 38a and 38b from their high points, as shown in this figure, to their low points, or intermediate these termini, the link 36 is not only moved in a direction toward the lower knife 47 but also the axes of the pins 37 are lowered about an arc drawn from the axis of the shaft 38. This, therefore, gives the effect of varying the knife clearance and also of assuring that the shearing edge of the knife 47 will be substantially perpendicular to the plate P when the shearing stroke begins. Thus, the displacement of the axes of the pins 37 serves to compensate for the fact that in the illustration the distance between the bottom shearing surface of the upper knife 47 and the upper surface of the plate has changed.

Scrap shearing mechanism

With reference to the scrap shearing operation, as previously mentioned, it is a feature of the herein-disclosed shear to shear into short lengths the scrap from the previous shearing operation during the shearing stroke of a succeeding side trimming operation. In this respect it will be appreciated that the scrap portions are deflected downwardly during the side trimming operation and will remain so after the plate is advanced to bring in a new portion thereof for side trimming. As such, the deflected marginal scrap portions will assist in properly guiding the plate as it is moved between the shears. Also, there will be no interference when the extension 53 of the upper knife head 46 is lowered so that the liner 54 will be able to freely engage the sheared edge of the plate. Since the scrap piece is deflected, the scrap knife 51 is arranged to precede the upper knife 47 and the lower scrap knife 52 is arranged at a lower elevation than that of the bottom knife 49, the relationship being such that the side trimming and scrap shearing operations are effected at the same time.

It will be appreciated that one of the benefits derived from the presently disclosed shear resides in the fact that the upper knife is arranged so that it will never completely engage the plate. In this way there is no tendency for the plate to be knicked, indented or marked as a result of the action between the end of the knife and the uncut portion of the plate.

Plate feeding mechanism

With reference to FIGURES 1b and 6, which illustrate the plate feeding assembly 18 of the present invention, to the main crank shaft 30 there is connected a pair of miter gears 56 which are connected to a second pair of miter gears 57 through a shaft 58, one of the gears 57 rotating a spur gear 59 which meshes with a spur gear 61, which is connected to a variable reciprocating crank assembly 62. The assembly illustrated is one of many well-known devices for obtaining a desired reciprocating rectilinear motion. This particular assembly has the characteristic of developing a first stroke of oscillation which will be identified herein as well as in FIGURE 6 as a feeding stroke, having a substantially greater duration than a second stroke of oscillation, which will be identified herein as well as in FIGURE 6 as a return stroke.

The crank assemby 62 includes a pivotally mounted arm 64 having an elongated slot 65 for receiving a sliding block 66, the block 66 being carried in a guide frame 68 which is rotatably carried by a shaft 67 rotatable by the spur gear 61. The block 66 is moved radially relative to the axis of the shaft 67 within the frame 68 by a screw 69 which passes through the shaft having at its one end a nut 71 for adjusting the block 66 radially relative to the axis of the shaft 67 and thus varying the oscillating stroke. To the upper end of the slotted arm 64 there is connected a link 72, the other end of the link being connected to a lower portion of a clamp 73 of the plate feeding assembly 18. Opposite the lower clamp 73 there is a movable clamp 74 which is brought into engagement with the upper surface of the plate P through the agency of a piston cylinder assembly 75.

By virtue of this mechanism, the feeding of the plate P is correlated to the variable speed of the shear 20. It will be appreciated that, while not shown in the drawings, the piston cylinder assembly 75 will be controlled by electrical or hydraulic devices, such as, a limit switch associated with the crank shaft 30 so that the engaging, advancing and releasing of the plate will be synchronized with the approach, shearing and return strokes of the shear. In this manner, if the shear speed is lowered to shear the thicker plates, or increased to shear thinner plates, a corresponding change will be made in the operation of the plate feeding assembly 18.

In addition to the correlation between the feeding of the plate and the shear speed, the crank assembly 62 has the advantage of being able to vary the stroke of the feeding assembly 18 pursuant to the characteristics of the plate, say for example, its thickness, although in certain instances width may be the controlling factor. It will be appreciated that in view of the fact that a portion of the upper knife does not come into contact with the plate, there is a certain portion of the plate under the knife that remains unsheared. The length of this portion will vary depending upon the thickness of the plate, a greater length will be sheared when thicker plates are being sheared than when thinner plates. To take advantage of this condition, the present invention contemplates the automatic feeding of the precise length of plate so that full advantage can be taken of the available capacity. This is accomplished by adjusting the radius of the block 66 relative to the axis of the shaft 67 to vary the length of the stroke of the arm 64. Should it be desired to accomplish this automatically, one way would be to vertically move the lower pivot pin of the arm 64 by a shaft connected to and arranged perpendicular to the pin which would be rotated by a motor-driven worm wheel set.

As shown in the legend appearing in FIGURE 6, approximately 100 degrees of the rotation of the crank 30, as represented by the arrows placed on the gear 61, will be needed to actually effect the shearing, so that the remainder of the cycle is available to grip, move and release the plate. The plate feeding assembly 18 is returned to its starting position during the shearing period which is the rapid moving period of the arm 64, wherein the feeding occurs during the slow period of movement of the arm 64. The inherent pause prior to the reversal of movements of the feeding assembly 18 as the block 66 passes through the diametrically opposite points on the horizontal of the circle of the block 66 will permit the clamp to be engaged and disengaged during a time when there is little or no relative movement between the plate and feeding assembly 18.

In accordance with the provisions of the patent statutes, I have explained the principle and operation of my invention and have illustrated and described what I consider to represent the best embodiment thereof. However, I desire to have it understood that within the scope of the appended claims, the invention may be practiced otherwise than as specifically illustrated and described.

I claim:

1. In a shear for severing material, such as, strip and plate comprising a housing,
   a shaft rotatably carried by said housing,
   a frame received in said housing and carried by said shaft in a manner to cause reciprocatory movement of said frame in a direction toward and away from said material,
   a knife head received by said frame in a manner to allow relative movement therebetween,
   a first knife carried by said knife head,
   a second knife arranged so that the material can be placed between the two knives,
   said knife head carried by said shaft in a manner to cause the first knife to move toward said other knife to effect a severing of the material and thereafter to move away from said other knife, and
   means associated with said frame for causing said knife head and hence said first knife to assume a desired path of movement during the severing of the material and immediately thereafter.

2. In a shear, according to claim 1, wherein said means associated with said knife head for controlling movement of said first knife includes a member pivotally connected at one portion to said frame and at other portion to said housing,
   means for adjusting the axis of rotation of one of the connecting portions of said member to vary the path of movement of said first knife during the severing of the material and immediately thereafter.

3. In a shear, according to claim 2, wherein said member is so constructed and its connecting portions with respect to said frame and housing are so arranged relative to said first and second knives, said shaft and the thickness of material that the first knife is positioned substantially perpendicular to the material during the entire severing of the material and upon completion thereof said first knife is immediately moved away from said sheared edge of the material, and maintained in this position until it passes the sheared edge during its movement away from said second knife.

4. In a shear, according to claim 1, wherein a first eccentric is carried by said shaft to which said frame is connected,
   a second and a third eccentric carried by said shaft to which said knife head is connected,
   the construction being such that the controlled path of movement of the frame will control the path of movement of the knife head and the relative strokes of the frame and knife head are such that immediately after completion of the severing of the material the first knife will continue to move downwardly while the frame will commence moving in the opposite direction to move the first knife away from the sheared edge of the material.

5. In a shear, according to claim 4, wherein said first knife is raked and its length is such and the stroke of the knife head is such that the upper portion of the first knife will not contact the material.

6. In a shear, according to claim 1, wherein the first knife is raked,
   a first scrap knife mounted at the lower end of said first knife, and
   a second scrap knife located to cooperate with said first scrap knife to shear a scrap portion of the material previously severed by said first and second knives.

7. In a shear, according to claim 1, including means so mounted on said knife head so as to engage the sheared edge of the material prior to commencing of the severing of the material to urge the material transversely away from said first knife.

8. In a shear, according to claim 1, a material feeding means connected to said shaft,
   said feeding means comprising a first and a second clamp between which the material is passed,
   means for moving one of said clamps relative to the other to clamp material passed therebetween,
   said strip feeding means mounted in a manner to move toward and away from said shear,
   means for effecting movement of the clamps toward and away from said shear after they have been caused to engage the material to advance a predetermined length of material to the shear in time sequence with the non-shearing phase of the movement of said first knife.

9. In a shear, according to claim 8, wherein the feeding means includes a variable reciprocatory crank assembly having a feeding and return stroke, said feeding stroke covering a relatively long period of time in comparison with said return stroke,
   means for connecting said crank assembly to one of said clamps,
   means for operating said crank assembly, and
   means for connecting said crank assembly operating means to said shaft in a manner that the feeding and returning strokes of said feeding means are synchronized with the non-shearing and shearing phases, respectively, of the movement of said first knife.

References Cited by the Examiner

UNITED STATES PATENTS 3,154,988  11/1964  Greis _____ 83—558 X

FOREIGN PATENTS 930,721  8/1947  France.

WILLIAM W. DYER, JR., *Primary Examiner.*